United States Patent
Yuan et al.

(10) Patent No.: US 12,356,460 B2
(45) Date of Patent: Jul. 8, 2025

(54) DYNAMIC ACTIVE TIME TRIGGER IN CONTENTION FREE RANDOM ACCESS

(71) Applicant: Nokia Technologies Oy, Espoo (FI)

(72) Inventors: Ping Yuan, Beijing (CN); Pingping Wen, Shanghai (CN); Chunli Wu, Beijing (CN)

(73) Assignee: Nokia Technologies Oy, Espoo (FI)

( * ) Notice: Subject to any disclaimer, the term of this patent is extended or adjusted under 35 U.S.C. 154(b) by 752 days.

(21) Appl. No.: 17/766,997

(22) PCT Filed: Nov. 7, 2019

(86) PCT No.: PCT/CN2019/116326
§ 371 (c)(1),
(2) Date: Apr. 6, 2022

(87) PCT Pub. No.: WO2021/087884
PCT Pub. Date: May 14, 2021

(65) Prior Publication Data
US 2022/0369377 A1    Nov. 17, 2022

(51) Int. Cl.
*H04W 74/0833*    (2024.01)
(52) U.S. Cl.
CPC ............................... *H04W 74/0833* (2013.01)
(58) Field of Classification Search
CPC ............. H04W 74/0833; H04W 72/23; H04W 74/0838; H04W 76/28; Y02D 30/70
See application file for complete search history.

(56) References Cited

U.S. PATENT DOCUMENTS

| 2016/0192433 A1 | 6/2016 | Deenoo et al. |
| 2017/0367107 A1 | 12/2017 | Comsa et al. |
| 2019/0215897 A1 | 7/2019 | Babaei et al. |
| 2019/0320353 A1 | 10/2019 | Kim et al. |

FOREIGN PATENT DOCUMENTS

| CN | 108811164 A | 11/2018 |
| WO | 2019/033017 A1 | 2/2019 |
| WO | 2019/195457 A1 | 10/2019 |
| WO | 2019/202375 A1 | 10/2019 |

OTHER PUBLICATIONS

R2-1913582 "DRX adaption for NTN" Ericsson 3GPP TSG WG2 #107bis Chongqing Oct. 14-18, 2019 (Year: 2019).*

(Continued)

*Primary Examiner* — Basil Ma
(74) *Attorney, Agent, or Firm* — Barta Jones, PLLC

(57) ABSTRACT

Embodiments of the present disclosure relate to dynamic active time trigger in CFRA. A first device receives a random access request from a second device in a discontinuous reception mode. The first device transmits a random access response to the second device. The random access response comprises at least one of: an indicator of an offset between a reception of the random access response and a start of monitoring scheduling information from the first device, or a flag indicating whether the indicator is present in the random access response. The first device transmits the scheduling information to the second device based on the offset.

20 Claims, 6 Drawing Sheets

(56) References Cited

OTHER PUBLICATIONS

"3rd Generation Partnership Project; Technical Specification Group Radio Access Network; Solutions for NR to support non terrestrial networks (NTN) (Release 16)", 3GPP TR 38.821, V0.8.0, Sep. 2019, pp. 1-92.

"3rd Generation Partnership Project; Technical Specification Group Radio Access Network; NR; Medium Access Control (MAC) protocol specification (Release 15)", 3GPP TS 38.321, V15.7.0, Sep. 2019, pp. 1-78.

"DRX adaptions for NTN", 3GPP TSG-RAN WG2 #107bis, R2-1913582, Agenda: 6.6.3.1, Ericsson, Oct. 14-18, 2019, pp. 1-9.

"Report of Email Discussion [107#60] [NR/NTN] RACH capacity evaluation and procedures", 3GPP TSG-RAN WG2 Meeting #107bis, R2-1912664, Agenda: 6.6.3.1, ZTE, Oct. 14-18, 2019, pp. 1-29.

"3rd Generation Partnership Project; Technical Specification Group Radio Access Network; NR; Physical layer procedures for control (Release 15)", 3GPP TS 38.213, V15.7.0, Sep. 2019, pp. 1-108.

"3rd Generation Partnership Project; Technical Specification Group Radio Access Network; NR; Radio Resource Control (RRC) protocol specification (Release 15)", 3GPP TS 38.331, V15.7.0, Sep. 2019, pp. 1-527.

"Discussion on NoMA related procedures", 3GPP TSG RAN WG1 Meeting #94, R1-1808051, Agenda: 7.2.1.3, Huawei, Aug. 20-24, 2018, 5 pages.

"Clarification of PDCCH monitoring period with non-zero DRX-startoffset for NB-IoT", 3GPP TSG-RAN2 Meeting #107-Bis, R2-1913067, NTT Docomo Inc, Oct. 14-18, 2019, 5 pages.

"IEEE 802.11", Wikipedia, Retrieved on Apr. 8, 2022, Webpage available at : https://en.wikipedia.org/wiki/IEEE_802.11, 15 pages.

International Search Report and Written Opinion received for corresponding Patent Cooperation Treaty Application No. PCT/CN2019/116326, dated Jul. 27, 2020, 9 pages.

\* cited by examiner

DYNAMIC ACTIVE TIME TRIGGER IN CONTENTION FREE RANDOM ACCESS

RELATED APPLICATION

This application claims priority to PCT Application No. PCT/CN2019/116326 filed Nov. 7, 2019, which is incorporated herein by reference in its entirety.

FIELD

Embodiments of the present disclosure generally relate to the field of telecommunication and in particular, to a device, method, apparatus and computer readable storage medium for dynamic active time trigger in contention free random access (CFRA).

BACKGROUND

Discontinuous reception (DRX) is a method for reducing power consumption by allowing a communication device to discontinuously receive information from another communication device. For example, when the DRX is configured, a terminal device is allowed to enter active time triggered by certain events to monitor a downlink channel from a network device.

When the terminal device performs CFRA, the terminal device will enter active time and start monitoring the scheduling information immediately after receiving a random access response from the network device. If there is a high round trip time latency between the terminal device and the network device, the terminal device will not receive the scheduling information until at least the high round trip time latency has elapsed, even if the terminal device is in active time. Thus, the terminal device will have unnecessary power consumption in CFRA procedure. Therefore, it still needs to discuss how to reduce power consumption of the terminal device in CFRA.

SUMMARY

In general, example embodiments of the present disclosure provide a solution for dynamic active time trigger in CFRA.

In a first aspect, there is provided a first device. The first device comprises at least one processor; and at least one memory including computer program codes; the at least one memory and the computer program codes are configured to, with the at least one processor, cause the first device to: receive a random access request from a second device in a discontinuous reception mode; transmit a random access response to the second device, the random access response comprising at least one of: an indicator of an offset between a reception of the random access response and a start of monitoring scheduling information from the first device, or a flag indicating whether the indicator is present in the random access response; and transmit the scheduling information to the second device based on the offset.

In a second aspect, there is provided a second device. The second device comprises at least one processor; and at least one memory including computer program codes; the at least one memory and the computer program codes are configured to, with the at least one processor, cause the second device to: transmit a random access request to a first device; receive a random access response from the first device, the random access response comprising at least one of: an indicator of an offset between a reception of the random access response and a start of monitoring scheduling information from the first device, and a flag indicating whether the indicator is present in the random access response; and receive the scheduling information from the first device based on the offset.

In a third aspect, there is provided a method implemented at a first device. The method comprises: receiving, at a first device, a random access request from a second device in a discontinuous reception mode; transmitting a random access response to the second device, the random access response comprising at least one of: an indicator of an offset between a reception of the random access response and a start of monitoring scheduling information from the first device, or a flag indicating whether the indicator is present in the random access response; and transmitting the scheduling information to the second device based on the offset.

In a fourth aspect, there is provided a method implemented at a second device. The method comprises: transmitting a random access request from a second device to a first device; receiving a random access response from the first device, the random access response comprising at least one of: an indicator of an offset between a reception of the random access response and a start of monitoring scheduling information from the first device, and a flag indicating whether the indicator is present in the random access response; and receiving the scheduling information from the first device based on the offset.

In a fifth aspect, there is provided an apparatus. The apparatus comprises: means for receiving, at a first device, a random access request from a second device in a discontinuous reception mode; means for transmitting a random access response to the second device, the random access response comprising at least one of: an indicator of an offset between a reception of the random access response and a start of monitoring scheduling information from the first device, or a flag indicating whether the indicator is present in the random access response; and means for transmitting the scheduling information to the second device based on the offset.

In an sixth aspect, there is provided an apparatus. The apparatus comprises: means for transmitting a random access request from a second device to a first device; means for receiving a random access response from the first device, the random access response comprising at least one of: an indicator of an offset between a reception of the random access response and a start of monitoring scheduling information from the first device, and a flag indicating whether the indicator is present in the random access response; and means for receiving the scheduling information from the first device based on the offset.

In a seventh aspect, there is provided a non-transitory computer readable medium comprising a computer program for causing an apparatus to perform at least the method according to the above third aspect.

In an eighth aspect, there is provided a non-transitory computer readable medium comprising a computer program for causing an apparatus to perform at least the method according to the above fourth aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
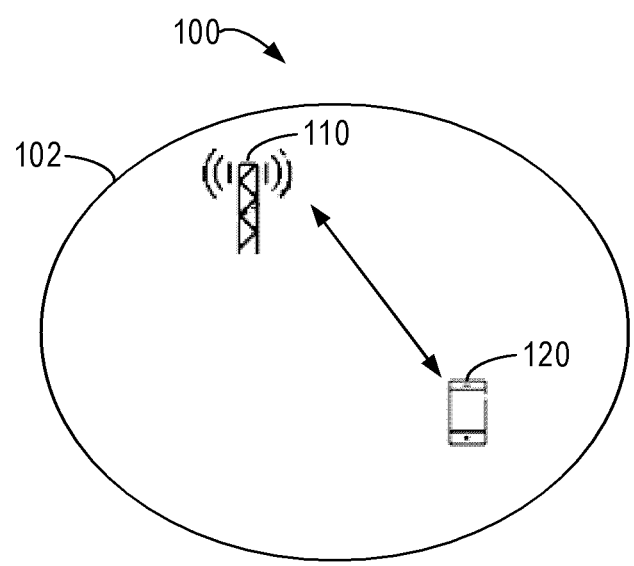
FIG. 1 illustrates an example communication network in which embodiments of the present disclosure may be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:
 (a) hardware-only circuit implementations (such as implementations in only analog and/or digital circuitry) and
 (b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and
 (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

Although functionalities described herein can be performed, in various example embodiments, in a fixed and/or a wireless network node may, in other example embodiments, functionalities may be implemented in a user equipment apparatus (such as a cell phone or tablet computer or laptop computer or desktop computer or mobile IOT device or fixed TOT device). This user equipment apparatus can, for example, be furnished with corresponding capabilities as described in connection with the fixed and/or the wireless network node(s), as appropriate. The user equipment apparatus may be the user equipment and/or or a control device, such as a chipset or processor, configured to control the user equipment when installed therein. Examples of such functionalities include the bootstrapping server function and/or the home subscriber server, which may be implemented in the user equipment apparatus by providing the user equipment apparatus with software configured to cause the user equipment apparatus to perform from the point of view of these functions/nodes.

FIG. 1 shows an example communication network 100 in which embodiments of the present disclosure can be implemented. The network 100 includes a first device 110 and a second device 120 that can communicate with each other. In this example, the second device 120 is illustrated as a terminal device, and the first device 110 is illustrated as a network device serving the terminal device. Thus, the serving area of the first device 110 is called as a cell 102. It is to be understood that the number of network devices and terminal devices is only for the purpose of illustration without suggesting any limitations. The system 100 may include any suitable number of network devices and terminal devices adapted for implementing embodiments of the present disclosure. Although not shown, it would be appreciated that one or more terminal devices may be located in the cell 102 and served by the first device 110.

Communications in the communication system 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

In some embodiments, the communication network 100 may include non-terrestrial networks (NTN). In NTN, propagation delays are higher than terrestrial network (TN). The NTN may comprise a non-terrestrial access network based on Geo Stationary earth Orbit (GEO) and a non-terrestrial access network based on Low Earth Orbit (LEO). The non-terrestrial access network based on GEO may relate to scenarios A and B. The non-terrestrial access network based on LEO may relate to scenarios C and D. In the scenarios A and C, the satellite payload implements frequency conversion and a Radio Frequency amplifier in both uplink and downlink directions. Hence, the satellite repeats the NR-Uu radio interface from the feeder link (between the NTN gateway and the satellite) to the service link (between the satellite and the terminal device) and vice versa. In the scenarios B and D, the satellite payload implements regeneration of the signals received from Earth, with NR-Uu radio interface on the service link between the terminal device and the satellite. Table 1 shows the maximum coverable distance for NTN satellites according to the assumptions presented in the TR 38.821 and the respective round trip time (RTT) latency in NTN.

TABLE 1

| Scenarios | Non-terrestrial access network based on GEO (Scenarios A and B) | Non-terrestrial access network based on LEO (Scenarios C and D) |
| --- | --- | --- |
| Altitude | 35,786 km | 600 km<br>1,200 km |
| Maximum distance between satellite and terminal device at min elevation angle | 40,586 km | 1,932 km<br>(600 km altitude)<br>3,131 km<br>(1,200 km altitude) |
| maximum RTT latency (propagation delay only) | Scenario A:<br>541.14 ms<br>(service and feeder links)<br>Scenario B:<br>271.57 ms<br>(service link only) | Scenario C:<br>(service and feeder links)<br>25.76 ms(600 km)<br>41.75 ms(1200 km)<br>Scenario D:<br>(service link only)<br>12.88 ms(600 km)<br>20.87 ms(1200 km) |

The RTT estimated for the NTN is different from that in current cellular deployments. As shown in Table 1, the RTT estimated for the NTN network is very high, for example, between 12.88 and 541 ms. With the high RTT in NTN, the legacy HARQ based on Stop-and-Wait mechanism will introduce high latency for data transmission.

Additionally, communications between the first device 110 and the second device 120 may have different latency requirements. For example, control signaling and mission critical data may have a strict latency requirement (i.e., small latency is acceptable), while other service like file downloading which is less critical may have a less latency requirement (i.e. high latency is acceptable).

The second device 120 may be configured with DRX mode. When the DRX mode is configured, the second device 120 discontinuously monitors control information and/or data transmitted from the first device 110. In the DRX mode, to transmit data to the first device 110, the second device 120 may first awake to monitor control information which indicates whether the device is scheduled to transmit data and how the data can be transmitted. A DRX cycle specifies the periodic repetition of the on-duration followed by a possible period of inactivity. The DRX cycle includes an on-duration and an off-duration. The on-duration is a duration in which a device monitors control information within the DRX cycle. The control information may include information communicated in a physical downlink control channel (PDCCH).

The DRX cycle is configured to keep the second device 120 awake periodically during an active time indicated by a timer called an onDuration timer in case there is data transmission scheduled. The active time for the second device 120 in the DRX cycle may include a duration in which the control information is periodically monitored.

When the DRX cycle is configured, the active time may include the time while:
  drx-onDurationTimer or drx-InactivityTimer or drx-RetransmissionTimerDL or drx-RetransmissionTimerUL or ra-ContentionResolutionTimer is running; or
  a Scheduling Request is sent on physical uplink control channel (PUCCH) and is pending; or
  a PDCCH indicating a new transmission addressed to the cell-radio network temporary identifier (C-RNTI) of the medium access control (MAC) entity has not been received after successful reception of a random access response for the random access preamble not selected by the MAC entity among the contention-based random access preamble.

When a terminal device performs CFRA, the terminal device will enter active time and start monitoring scheduling information after receiving a random access response from a network device. In current cellular deployments, the network device will typically not schedule the terminal device before the transmission according to a grant in the random access response has been received. If there is a high RTT latency between the terminal device and the network device, the terminal device will not receive the scheduling information until at least the high RTT latency has elapsed, even if the terminal device is in active time. Thus, the terminal device will have unnecessary power consumption in CFRA procedure.

Conventionally, in order to reduce power consumption of a terminal device in CFRA procedure, it is proposed to introduce an offset with fixed value RTT to when the terminal device should enter active time when performing CFRA. When the terminal device sent a physical uplink shared channel (PUSCH) message as granted in the received RAR, it cannot expect a response until RTT ms have elapsed. If DRX is configured, the terminal device could enter DRX and be reachable according to its onDuration periods.

It is true that the unnecessary power consumption issue to monitor PDCCH can be solved as proposed above. However, it introduces new problem to reduce latency to support low latency service and handover in NTN.

Specifically, the terminal device can be scheduled only after RTT ms after the terminal device receives the random access response. This means that the scheduling delay between the terminal device receiving the random access response and receiving scheduling information is at least RTT, for example 540 ms in the non-terrestrial access network based on GEO. The high latency scheduling will bring trouble in following scenarios.

Scenario 1: for the service for the terminal device, the control signaling and mission critical data may have a strict latency requirement (i.e., small latency).

Scenario 2: for handover of the terminal device, to reduce the service interruption between the terminal device receiving handover command from a source cell and accessing to a target cell. The RTT level (for example, 540 ms) of service interruption is not acceptable to support continuous service.

According to some example embodiments, there is provided a solution for dynamic active time trigger in CFRA. In an example embodiment, a first device determines an offset between a reception of a random access response and a start of monitoring scheduling information from the first device. The first device transmits the random access response to the second device. The random access response comprises at least one of an indicator of the offset, or a flag indicating whether the indicator is present in the random access response. In this way, if the communications between the first device and the second device have a strict latency requirement, the first device may determine the offset as a small value. If the communications between the first device and the second device have a less latency requirement, the first device may determine the offset as a high value. Thus, service based DRX active time trigger in CFRA may be supported to enable the low latency service in CRFA and high latency service which may exist in the same device in NTN. In addition, low service interruption in handover, especially in the case of NTN GEO with RTT=540 ms, may be supported. Furthermore, because the offset is fully controlled by the first device, the first device can balance power saving of the second device and service latency requirement or service interruption requirements as well as system load. It also enables the possibility for the first device to blindly schedule the second device after the RAR reception point based on the offset.

Figure 2:
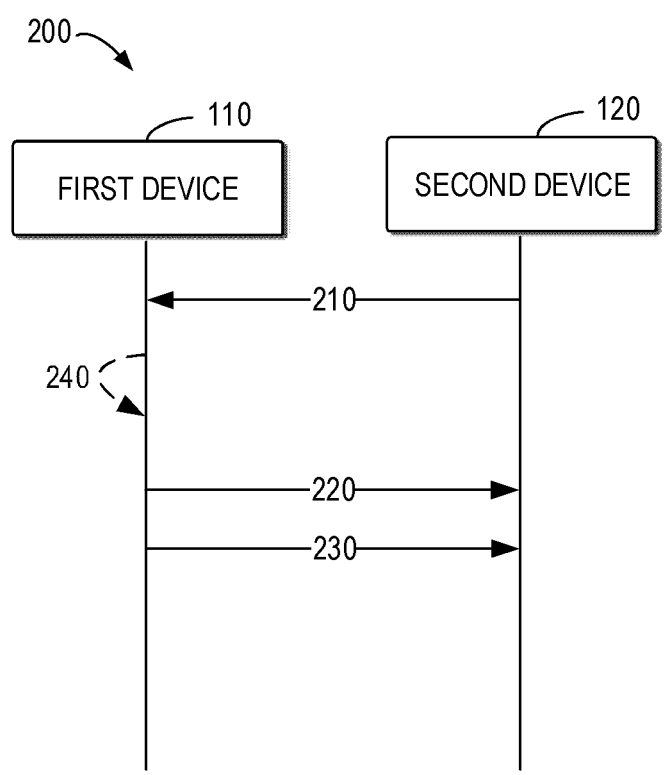
FIG. 2 illustrates a signaling chart illustrating a process for dynamic active time trigger in CFRA according to some example embodiments of the present disclosure.

Reference is now made to FIG. 2, which shows a signaling chart 200 for dynamic active time trigger in CFRA according to an example embodiment of the present disclosure. For the purpose of discussion, the signaling chart 200 will be described with reference to FIG. 1. The signaling chart 200 may involve the first device 110 and the second device 120 as illustrated in FIG. 1. It would be appreciated that although the signaling chart 200 has been described in the communication system 100 of FIG. 1, this process may be likewise applied to other communication scenarios. It would also be appreciated that although DRX configured for the second device is discussed, a similar process can be applied for DRX configured for the first device.

The first device 110 receives 210 a random access request from the second device 120 in a DRX mode. The first device 110 transmits 220 a random access response to the second device 120. The random access response comprises at least one of: an indicator of an offset between a reception of the random access response and a start of monitoring scheduling information from the first device 110, or a flag indicating whether the indicator is present in the random access response.

Accordingly, the second device 120 receives the random access response from the first device 110. The second device 120 will enter an active time to start monitoring the scheduling information after the time as defined by the offset in the random access response elapses.

The first device 110 transmits 230 the scheduling information to the second device 120 based on the offset. Accordingly, the second device 120 receives the scheduling information from the first device 110 based on the offset. Based on the scheduling information, the second device 120 may determine when and/or how it is scheduled to transmit data to the first device 110.

According to the present disclosure, because the offset is fully controlled by the first device, the first device can balance power saving of the second device and service latency requirement or service interruption requirements as well as system load.

In some example embodiments, optionally, the first device 110 determines 240 the offset based on a latency requirement of communications between the first device 110 and the second device 120.

In some example embodiments, if the communications between the first device 110 and the second device 120 have a less latency requirement, the first device 110 may determine the offset as a high value (which is also referred to as a first value). For example, if the latency requirement exceeds a predetermined threshold latency, the first device 110 may determine the offset as the first value. In other example embodiments, if the communications between the first device 110 and the second device 120 have a strict latency requirement, the first device 110 may determine the offset as a small value (which is also referred to as a second value). For example, if the latency requirement is below a predetermined threshold latency, the first device 110 may determine the offset as the second value. Thus, service based DRX active time trigger in CFRA may be supported to enable the low latency service in CRFA and high latency service which may exist in the same device in NTN.

In some example embodiments, the first and second values may be preconfigured.

In some example embodiments, the first value may be equal to an RTT. In some example embodiments, the RTT may be equal to a first Timing Advance broadcasted by the first device. In some other example embodiments, the RTT may be equal to equal to an estimation of a second Timing Advance received from the second device 120. The second value may be equal to any appropriate value less than the first value. For example, in case where the first value is equal to the RTT, the second value may be equal to one of the following: zero, 1/3*RTT, 2/3*RTT, 1/4*RTT, 1/2*RTT, 1/4*RTT.

Figure 3A:
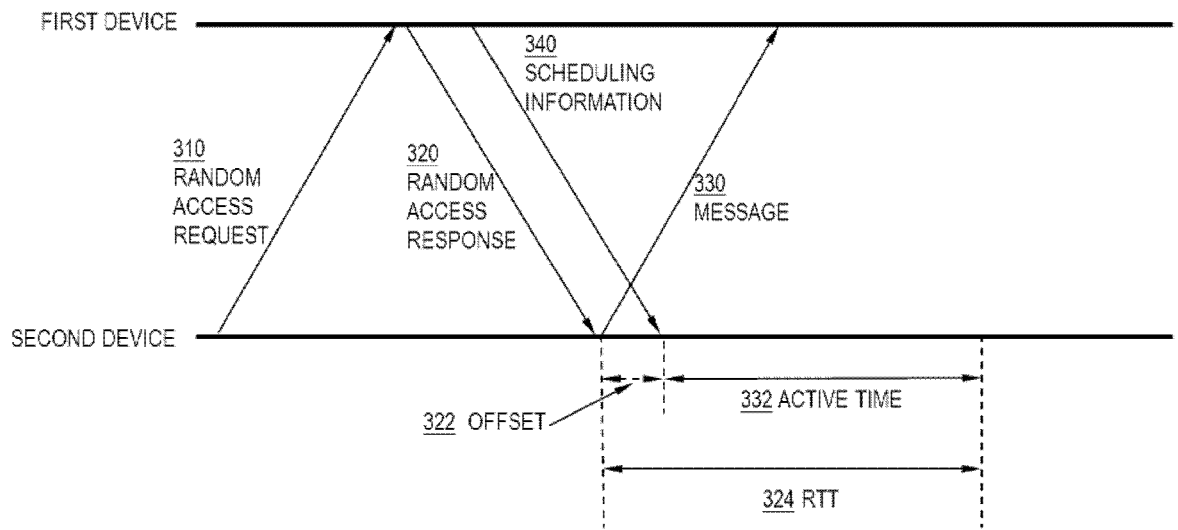
FIG. 3A illustrates an example active time trigger according to some example embodiments of the present disclosure.

FIG. 3A illustrates an example active time trigger according to some example embodiments of the present disclosure. In the example of FIG. 3A, the offset is determined as the second value that is less than the RTT.

As shown in FIG. 3A, the first device 110 receives a random access request 310 from the second device 120. The random access request 310 comprises a preamble for CFRA.

The first device 110 transmits a random access response 320 to the second device 120. The random access response 320 comprises an indicator of an offset 322. The offset 322 is less than an RTT 324.

Upon receiving the random access response 320, the second device 120 transmits a message 330 to the first device 110 according to a grant received in the random access response 320.

The second device 120 enters an active time 332 and monitors scheduling information 340 from the first device 110 after the offset 322 elapses. The first device 110 transmits the scheduling information 340 to the second device 120 after the offset 322 elapses.

It may be noted that the first device 110 transmits the scheduling information 340 to the second device 120 before receiving the message 330 as an acknowledgment of the random access response 320. The successful rate of the second device 120 performing CFRA can be guaranteed by the preamble with enough power level considering no preamble contention in CFRA. Thus, it should be possible for the first device 110 to blindly schedule the second device 120 after reception of the random access response 320 an before reception of the message 330.

Figure 3B:
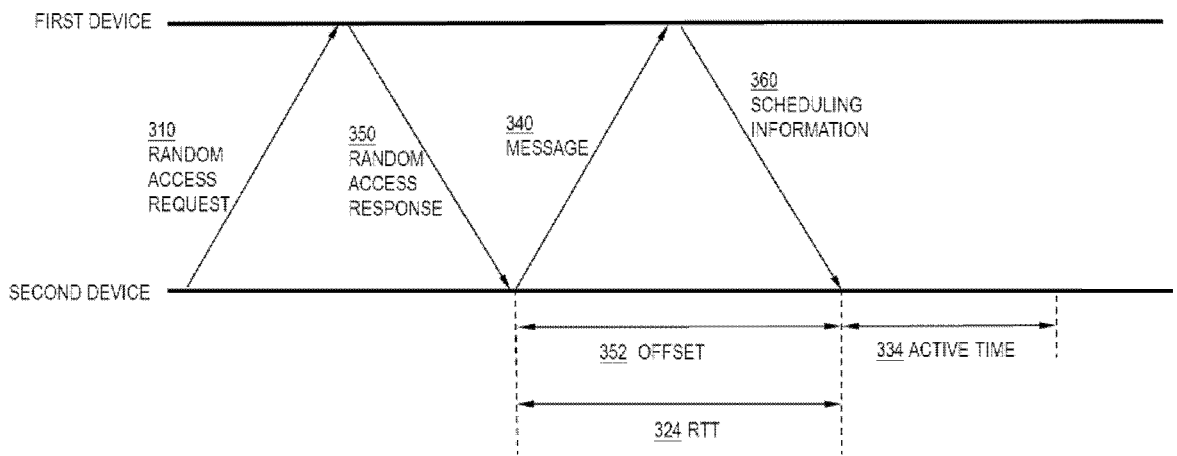
FIG. 3B illustrates an example active time trigger according to some other example embodiments of the present disclosure.

FIG. 3B illustrates another example active time trigger according to some other example embodiments of the present disclosure. In the example of FIG. 3B, the offset is determined as the first value that is equal to the RTT.

Different from the example of FIG. 3A, a random access response 350 from the first device 110 comprises an indicator of an offset 352. The offset 352 is equal to the RTT 324.

Upon receiving the random access response 350, the second device 120 transmits a message 340 to the first device 110 according to a grant received in the random access response 350. The message 340 may be considered as an acknowledgment that the second device 120 received the random access response 350.

The second device 120 enters an active time 334 and monitors scheduling information 360 after the offset 352 elapses. The offset 352 that is equal to the RTT 324 may make sure the CFRA is successful. The first device 110 transmits the scheduling information 360 to the second device 120 after the offset 352 elapses.

It should be understood that the first and second values are described just for example. The first device 110 may determine the offset as any appropriate value based on the latency requirement of communications between the first device 110 and the second device 120, and the scope of the present disclosure is not limited thereto.

In some example embodiments, a new field may be added in the random access response to contain the indicator of the offset. For the purpose of discussion, the new field is also referred to as an offset indicator field.

In some example embodiments, a size of the offset indicator field may be one bit. Table 2 shows the random access response (RAR) with the offset indicator field of one bit.

TABLE 2

| RAR grant field | Number of bits |
| --- | --- |
| Frequency hopping flag | 1 |
| PUSCH frequency resource allocation | 14 |
| PUSCH time resource allocation | 4 |
| MCS | 4 |
| TPC command for PUSCH | 3 |
| CSI request | 1 |
| Offset indicator | 1 |

In such embodiments, the first device 110 may set the indicator to be a first predefined value indicating the first value, or a second predefined value indicating the second value. The second predefined value is different from the first predefined value. For example, the first device 110 may set the indicator to be "1" indicating the first value and "0" indicating the second value. Alternatively, the first device 110 may set the indicator to be "0" indicating the first value and "1" indicating the second value.

In other example embodiments, the size of the offset indicator field may be more bits. Table 3 shows the random access response (RAR) with the offset indicator field of N bits, where N is a natural number greater than one.

TABLE 3

| RAR grant field | Number of bits |
|---|---|
| Frequency hopping flag | 1 |
| PUSCH frequency resource allocation | 14 |
| PUSCH time resource allocation | 4 |
| MCS | 4 |
| TPC command for PUSCH | 3 |
| CSI request | 1 |
| Offset indicator | N |

In some example embodiments, the N bits may indicate the offset at a granularity of RTT/(2^N−1). For example, if N=2, the granularity of the offset may be RTT/3, and mapping between values of the offset indicator and values of the offset may be as below:

TABLE 4

| Offset indicator | Offset |
|---|---|
| 00 | 0 |
| 01 | ⅓*RTT |
| 10 | ⅔*RTT |
| 11 | RTT |

As described above, the random access response comprises at least one of the indicator of the offset, or the flag indicating whether the indicator is present in the random access response. In some example embodiments, a further new field may be added in the random access response to contain the flag. For the purpose of discussion, the further new field is also referred to as a flag field.

In some example embodiments, the first device 110 may set the flag to be a third predefined value indicating an absence of the indicator and a value of the offset, or a fourth predefined value indicating a presence of the indicator. For example, the first device 110 may set the flag to be "1" indicating the presence of the indicator and "0" indicating the absence of the indicator. Alternatively, the first device 110 may set the flag to be "0" indicating the presence of the indicator and "1" indicating the absence of the indicator. Table 5 shows the random access response (RAR) with the flag field of one bit and the offset indicator field of M bits, where M is a natural number greater than one.

TABLE 5

| RAR grant field | Number of bits |
|---|---|
| Frequency hopping flag | 1 |
| PUSCH frequency resource allocation | 14 |
| PUSCH time resource allocation | 4 |
| MCS | 4 |
| TPC command for PUSCH | 3 |
| CSI request | 1 |
| Flag | 1 |
| Offset indicator | M |

In Table 5, the flag is set to be 1 indicating the presence of the indicator. Upon receiving the random access response comprising the flag with the indicator, the second device 120 enters the active time with the offset indicated by the indicator.

In other example embodiments, the flag may be set to be 0 to indicate the absence of the indicator and a value of the offset. For example, the value of the offset may be equal to the RTT. For another example, the value of the offset may be equal to zero. Upon receiving the random access response comprising the flag without the indicator, the second device 120 enters the active time with the offset indicated by the flag.

The value of M bits indicates that the value of the offset indicator equals to K*RTT/(2^M), where K is an integer. For example, if M=2, the granularity of the offset equals to RTT/4, and mapping between values of the offset indicator and values of the offset may be as below:

TABLE 6

| flag = 0 Offset indicator is absent | Offset |
|---|---|
| 0 | RTT |

| flag = 1 Offset indicator is present | Offset |
|---|---|
| 00 | 0 |
| 01 | ¼*RTT |
| 10 | ½*RTT |
| 11 | ¾*RTT |

In some example embodiments, the first device 110 may determine enumeration values for the offset based on the latency requirement of the communications. For example, the first device 110 may determine the enumeration values for the offset as {10 ms, 20 ms, 30 ms, 40 ms}. The first device 110 may transmit to the second device 120 a control signalling comprising the enumeration values for the offset. In such embodiments, the indicator of the offset may indicate an index of one of the enumeration values. For example, if N=2, mapping between the index and the offset may be as below:

TABLE 7

| Index | Offset |
|---|---|
| 00 | 10 ms |
| 01 | 20 ms |
| 10 | 30 ms |
| 11 | 40 ms |

Figure 4:
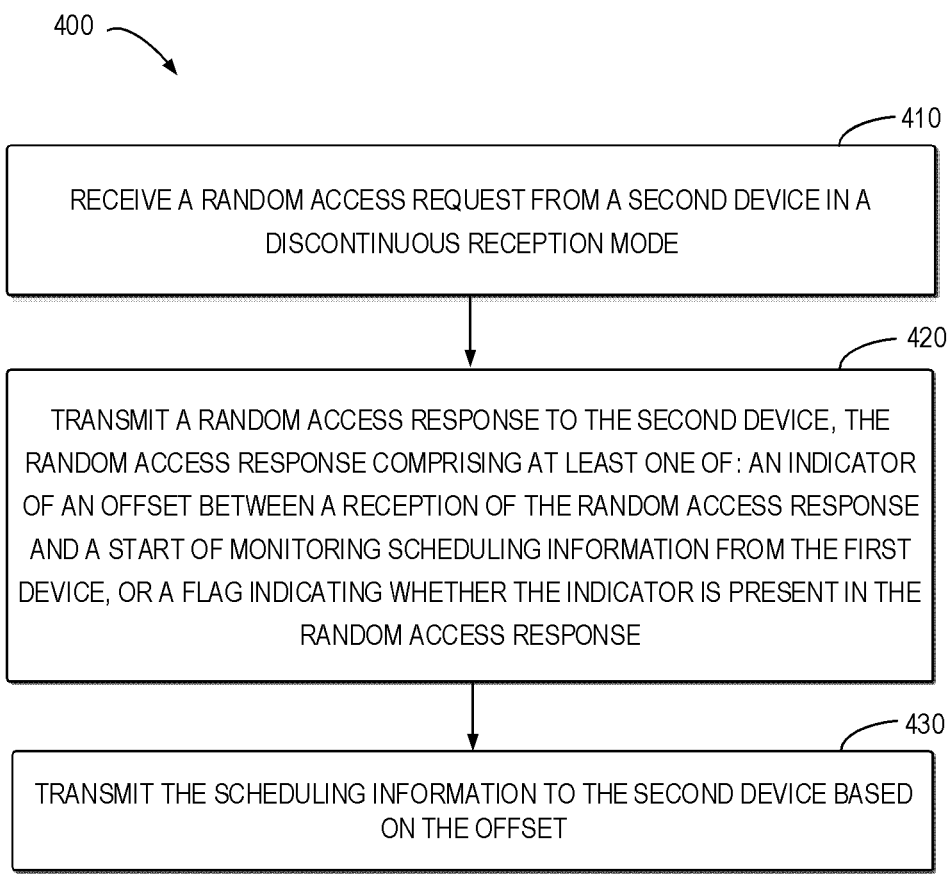
FIG. 4 illustrates a flowchart of a method implemented at a device according to some example embodiments of the present disclosure.

FIG. 4 shows a flowchart of an example method 400 implemented at a first device in accordance with some example embodiments of the present disclosure. For the purpose of discussion, the method 400 will be described from the perspective of the first device 110 with reference to FIG. 1. It would be appreciated that the method 400 may also be implemented at the second device 120 in FIG. 1.

At block 410, the first device 110 receives a random access request from the second device 120 in a discontinuous reception mode.

At block 420, the first device 110 transmits a random access response to the second device 120. The random access response comprises at least one of: an indicator of an offset between a reception of the random access response and a start of monitoring scheduling information from the first device 110, or a flag indicating whether the indicator is present in the random access response.

At block 430, the first device 110 transmits the scheduling information to the second device 120 based on the offset.

In some example embodiments, the method 400 further comprises determining the offset based on a latency requirement of communications between the first device and the second device.

In some example embodiments, determining the offset comprises determining the offset as a first value in accordance with a determination that the latency requirement exceeds a predetermined threshold latency; and the method 400 further comprises setting the indicator to be a first predefined value indicating the first value.

In some example embodiments, determining the offset comprises determining the offset as a second value in accordance with a determination that the latency requirement is below the predetermined threshold latency, the second value less than the first value; a and the method 400 further comprises setting the indicator to be a second predefined value indicating the second value, the second predefined value different from the first predefined value.

In some example embodiments, the first and second values are preconfigured.

In some example embodiments, the first value is equal to a first Timing Advance broadcasted by the first device.

In some example embodiments, the first value is equal to an estimation of a second Timing Advance received from the second device.

In some example embodiments, the method 400 further comprises transmitting to the second device a control signalling comprising enumeration values for the offset; and wherein the indicator indicates an index of one of the enumeration values.

In some example embodiments, the method 400 further comprises setting the flag to be a third predefined value indicating an absence of the indicator and a value of the offset.

Figure 5:
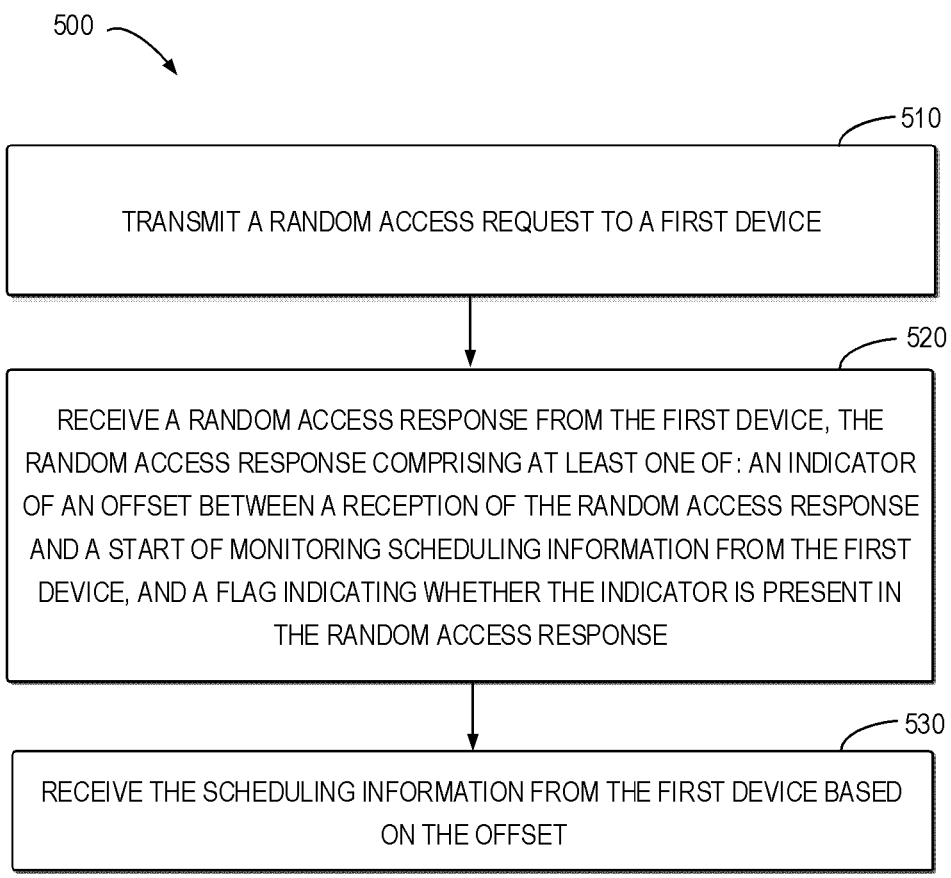
FIG. 5 illustrates a flowchart of a method implemented at a device according to some example embodiments of the present disclosure.

FIG. 5 shows a flowchart of an example method 500 implemented at a second device in accordance with some example embodiments of the present disclosure. For the purpose of discussion, the method 500 will be described from the perspective of the second device 120 with reference to FIG. 1. It would be appreciated that the method 500 may also be implemented at the first device 110 in FIG. 1.

At block 510, the second device 120 transmits a random access request to the first device 110.

At block 520, the second device 120 receives a random access response from the first device 110. The random access response comprises at least one of: an indicator of an offset between a reception of the random access response and a start of monitoring scheduling information from the first device 110, and a flag indicating whether the indicator is present in the random access response.

At block 530, the second device 120 receives the scheduling information from the first device 110 based on the offset.

In some example embodiments, the offset is determined based on a latency requirement of communications between the first device and the second device.

In some example embodiments, the offset is determined as a first value in response to the latency requirement exceeding a predetermined threshold latency; and wherein the indicator is set to be a first predefined value indicating the first value.

In some example embodiments, the offset is determined as a second value in response to the latency requirement below the predetermined threshold latency, the second value less than the first value; and wherein the indicator is set to be a second predefined value indicating the second value, the second predefined value different from the first predefined value.

In some example embodiments, the first and second values are preconfigured.

In some example embodiments, the first value is equal to a first Timing Advance broadcasted by the first device.

In some example embodiments, the first value is equal to an estimation of a second Timing Advance determined by the second device.

In some example embodiments, the method 500 further comprises receiving from the first device a control signalling comprising enumeration values for the offset; and wherein the indicator indicates an index of one of the enumeration values.

In some example embodiments, the flag is set to be a third predefined value indicating an absence of the indicator and a value of the offset.

It shall be appreciated that descriptions of features with reference to FIGS. 1 to 2 also apply to the methods 400 and 500, and have the same effects. Thus, the details of the features are omitted.

In some example embodiments, an apparatus capable of performing any of the method 400 (for example, the first device 110 or the second device 120) may comprise means for performing the respective steps of the method 400. The means may be implemented in any suitable form. For example, the means may be implemented in a circuitry or software module.

In some example embodiments, the apparatus comprises: means for receiving, at a first device, a random access request from a second device in a discontinuous reception mode; means for transmitting a random access response to the second device, the random access response comprising at least one of: an indicator of an offset between a reception of the random access response and a start of monitoring scheduling information from the first device, or a flag indicating whether the indicator is present in the random access response; and means for transmitting the scheduling information to the second device based on the offset.

In some example embodiments, the apparatus further comprises means for determining the offset based on a latency requirement of communications between the first device and the second device.

In some example embodiments, means for determining the offset comprises means for determining the offset as a first value in accordance with a determination that the latency requirement exceeds a predetermined threshold latency; and the apparatus further comprises means for setting the indicator to be a first predefined value indicating the first value.

In some example embodiments, means for determining the offset comprises means for determining the offset as a second value in accordance with a determination that the latency requirement is below the predetermined threshold latency, the second value less than the first value; a and the apparatus further comprises means for setting the indicator to be a second predefined value indicating the second value, the second predefined value different from the first predefined value.

In some example embodiments, the first and second values are preconfigured.

In some example embodiments, the first value is equal to a first Timing Advance broadcasted by the first device.

In some example embodiments, the first value is equal to an estimation of a second Timing Advance received from the second device.

In some example embodiments, the apparatus further comprises means for transmitting to the second device a control signaling comprising enumeration values for the offset; and wherein the indicator indicates an index of one of the enumeration values.

In some example embodiments, the apparatus further comprises setting the flag to be a third predefined value indicating an absence of the indicator and a value of the offset.

In some example embodiments, an apparatus capable of performing any of the method 500 (for example, the first device 110 or the second device 120) may comprise means for performing the respective steps of the method 500. The means may be implemented in any suitable form. For example, the means may be implemented in a circuitry or software module.

In some example embodiments, the apparatus comprises: means for transmitting a random access request from a second device to a first device; means for receiving a random access response from the first device, the random access response comprising at least one of: an indicator of an offset between a reception of the random access response and a start of monitoring scheduling information from the first device, and a flag indicating whether the indicator is present in the random access response; and means for receiving the scheduling information from the first device based on the offset.

In some example embodiments, the offset is determined based on a latency requirement of communications between the first device and the second device.

In some example embodiments, the offset is determined as a first value in response to the latency requirement exceeding a predetermined threshold latency; and wherein the indicator is set to be a first predefined value indicating the first value.

In some example embodiments, the offset is determined as a second value in response to the latency requirement below the predetermined threshold latency, the second value less than the first value; and wherein the indicator is set to be a second predefined value indicating the second value, the second predefined value different from the first predefined value.

In some example embodiments, the first and second values are preconfigured.

In some example embodiments, the first value is equal to a first Timing Advance broadcasted by the first device.

In some example embodiments, the first value is equal to an estimation of a second Timing Advance determined by the second device.

In some example embodiments, the apparatus further comprises means for receiving from the first device a control signaling comprising enumeration values for the offset; and wherein the indicator indicates an index of one of the enumeration values.

In some example embodiments, the flag is set to be a third predefined value indicating an absence of the indicator and a value of the offset.

Figure 6:
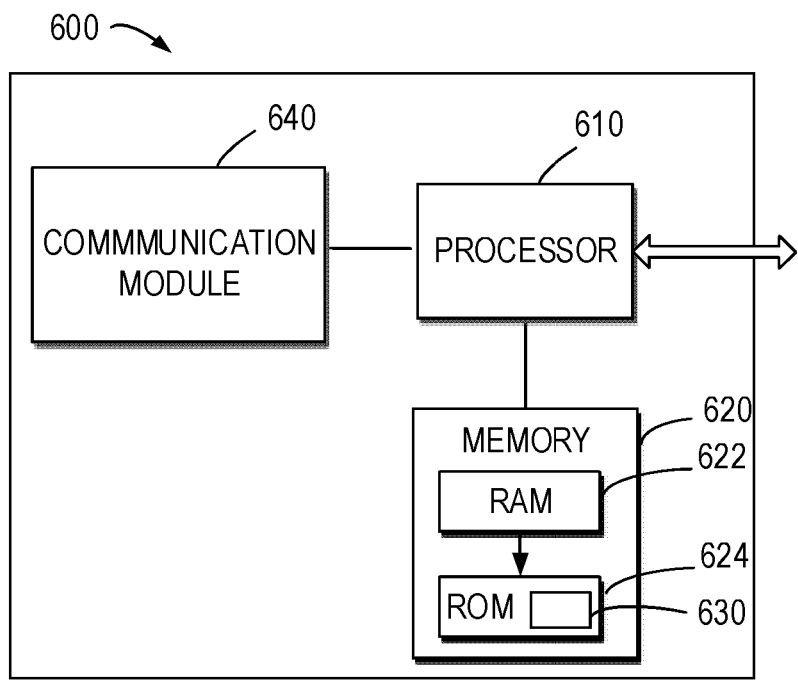
FIG. 6 illustrates a simplified block diagram of an apparatus that is suitable for implementing embodiments of the present disclosure.

FIG. 6 is a simplified block diagram of a device 600 that is suitable for implementing embodiments of the present disclosure. The device 600 may be provided to implement the communication device, for example, the first device 111 or the second device 120 as shown in FIG. 1. As shown, the device 600 includes one or more processors 610, one or more memories 620 coupled to the processor 610, and one or more communication modules 640 coupled to the processor 610.

The communication module 640 is for bidirectional communications. The communication module 640 has at least one antenna to facilitate communication. The communication interface may represent any interface that is necessary for communication with other network elements.

The processor 610 may be of any type suitable to the local technical network and may include one or more of the following: general purpose computers, special purpose computers, microprocessors, digital signal processors (DSPs) and processors based on multicore processor architecture, as non-limiting examples. The device 600 may have multiple processors, such as an application specific integrated circuit chip that is slaved in time to a clock which synchronizes the main processor.

The memory 620 may include one or more non-volatile memories and one or more volatile memories. Examples of the non-volatile memories include, but are not limited to, a Read Only Memory (ROM) 624, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 622 and other volatile memories that will not last in the power-down duration.

A computer program 630 includes computer executable instructions that are executed by the associated processor 610. The program 630 may be stored in the ROM 624. The processor 610 may perform any suitable actions and processing by loading the program 630 into the RAM 622.

The embodiments of the present disclosure may be implemented by means of the program 630 so that the device 600 may perform any process of the disclosure as discussed with reference to FIGS. 2 to 4. The embodiments of the present disclosure may also be implemented by hardware or by a combination of software and hardware.

Figure 7:
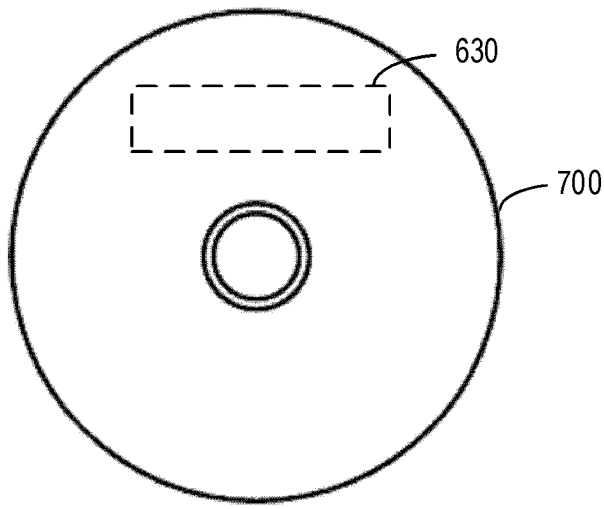
FIG. 7 illustrates a block diagram of an example computer readable medium in accordance with some example embodiments of the present disclosure.

In some example embodiments, the program 630 may be tangibly contained in a computer readable medium which may be included in the device 600 (such as in the memory 620) or other storage devices that are accessible by the device 600. The device 600 may load the program 630 from the computer readable medium to the RAM 622 for execution. The computer readable medium may include any types of tangible non-volatile storage, such as ROM, EPROM, a flash memory, a hard disk, CD, DVD, and the like. FIG. 7 shows an example of the computer readable medium 700 in form of CD or DVD. The computer readable medium has the program 630 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 400 as described above with reference to FIG. 4. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device, comprising:
   at least one processor; and
   at least one memory including computer program code;
   the at least one memory and the computer program code configured to, with the at least one processor, cause the first device to:
      receive a random access request from a second device in a discontinuous reception mode whereby the second device discontinuously monitors control information and data transmitted from the first device;
      determine an offset between a reception of the random access response and a start of monitoring scheduling information from the first device based on a latency requirement of communications between the first device and the second device, wherein determining the offset comprises:
         determining that the latency requirement exceeds a predetermined threshold latency; and
         determining the offset as a first value in accordance with the determination that the latency requirement exceeds the predetermined threshold latency, the first value being equal to a first Timing Advance broadcasted by the first device:
      set the indicator to be a first predefined value indicating the first value;
      based on the random access request, transmit a random access response to the second device, the random access response comprising: the indicator of the offset, and a flag indicating the indicator is present in the random access response; and
      transmit the scheduling information to the second device after the offset elapses.

2. The first device of claim 1, wherein the first and second values are preconfigured.

3. The first device of claim 2, wherein the first device is a network device and the second device is a user equipment.

4. The first device of claim 2, wherein the first device is a user equipment and the second device is a network device.

5. The first device of claim 4, wherein determining the offset is fully controlled by the first device and not the second device.

6. The first device of claim 5, wherein transmitting the scheduling information to the second device is performed prior to receiving, from the second device, a message acknowledging receipt of the random access response.

7. The first device of claim 6, wherein the random access request comprises a preamble for contention free random access (CFRA).

8. A system comprising:
   a first device;
   a second device,
   at least one processor; and
   at least one memory including computer program code;
   the at least one memory and the computer program code configured to, with the at least one processor, cause the first device to:
      receive a random access request from a second device in a discontinuous reception mode whereby the second device discontinuously monitors control information and data transmitted from the first device;

determine an offset between a reception of the random access response and a start of monitoring scheduling information from the first device based on a latency requirement of communications between the first device and the second device, wherein determining the offset comprises:
  determining that the latency requirement exceeds a predetermined threshold latency; and
  determining the offset as a first value in accordance with the determination that the latency requirement exceeds the predetermined threshold latency, the first value being equal to a first Timing Advance broadcasted by the first device;
set the indicator to be a first predefined value indicating the first value;
based on the random access request, transmit a random access response to the second device, the random access response comprising: the indicator of the offset, and a flag indicating the indicator is present in the random access response; and
transmit the scheduling information to the second device after the offset elapses.

9. The first device of claim 8, wherein the first and second values are preconfigured.

10. The first device of claim 9, wherein the first device is a network device and the second device is a user equipment.

11. The first device of claim 9, wherein the first device is a user equipment and the second device is a network device.

12. The first device of claim 11, wherein determining the offset is fully controlled by the first device and not the second device.

13. The first device of claim 12, wherein transmitting the scheduling information to the second device is performed prior to receiving, from the second device, a message acknowledging receipt of the random access response.

14. A method comprising:
  receiving, by a first device from a second device, a random access request from a second device in a discontinuous reception mode whereby the second device discontinuously monitors control information and data transmitted from the first device;
  determining, by the first device, an offset between a reception of the random access response and a start of monitoring scheduling information from the first device based on a latency requirement of communications between the first device and the second device, wherein determining the offset comprises:
    determining that the latency requirement exceeds a predetermined threshold latency; and
    determining the offset as a first value in accordance with the determination that the latency requirement exceeds the predetermined threshold latency, the first value being equal to a first Timing Advance broadcasted by the first device;
  setting, by the first device, the indicator to be a first predefined value indicating the first value;
  based on the random access request, transmitting, by the first device, a random access response to the second device, the random access response comprising: the indicator of the offset, and a flag indicating the indicator is present in the random access response; and
  transmitting, by the first device, the scheduling information to the second device after the offset elapses.

15. The method of claim 8, wherein the first and second values are preconfigured.

16. The method of claim 15, wherein the first device is a network device and the second device is a user equipment.

17. The method of claim 15, wherein the first device is a user equipment and the second device is a network device.

18. The method of claim 17, wherein determining the offset is fully controlled by the first device and not the second device.

19. The method of claim 18, wherein transmitting the scheduling information to the second device is performed prior to receiving, from the second device, a message acknowledging receipt of the random access response.

20. The method of claim 19, wherein the random access request comprises a preamble for contention free random access (CFRA).

* * * * *